United States Patent [19]

Rocklin

[11] 3,878,351

[45] Apr. 15, 1975

[54] DEVICE FOR APPLYING ELECTRODE TO A WORKPIECE FOR SPARK TREATMENT OF THE WORKPIECE

[76] Inventor: Isadore J. Rocklin, 3240 Douglas St., Sioux City, Iowa 51104

[22] Filed: Feb. 13, 1973

[21] Appl. No.: 332,216

[52] U.S. Cl.............. 219/69 G; 219/69 C; 219/69 V
[51] Int. Cl............................................... B23p 1/08
[58] Field of Search .... 219/69 G, 69 P, 69 V, 69 C, 219/76, 113, 131 R, 135

[56] References Cited
UNITED STATES PATENTS

| | | | |
|---|---|---|---|
| 2,223,177 | 11/1940 | Jones | 219/69 G UX |
| 3,183,397 | 5/1965 | Henry | 219/69 G |
| 3,250,894 | 5/1966 | Manz | 219/131 |
| 3,474,216 | 10/1969 | Morgan | 219/69 G |
| 3,604,884 | 9/1971 | Olsson | 219/69 G |

*Primary Examiner*—Bruce A. Reynolds

[57] ABSTRACT

An electronic metal router having a visual indicator to signal whether the machine is being properly operated. The indicator or the input to that indicator may also actuate a mechano-electrical device to operate the machine.

7 Claims, 6 Drawing Figures

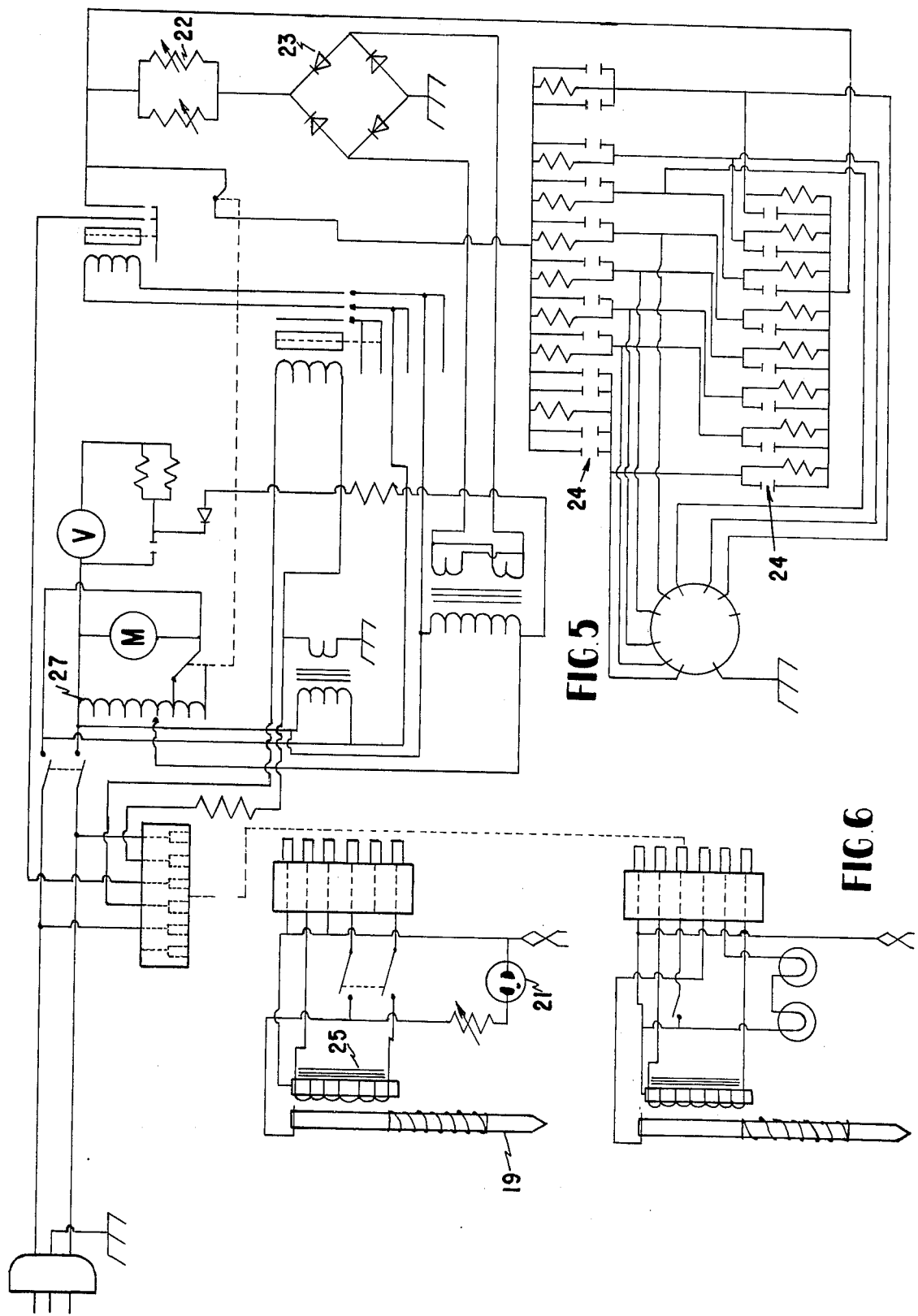

3,878,351

DEVICE FOR APPLYING ELECTRODE TO A WORKPIECE FOR SPARK TREATMENT OF THE WORKPIECE

BACKGROUND AND SUMMARY OF THE INVENTION

This invention pertains to machines for electronic routing or disintegration of metal in selected areas or for electric deposition of metal and more particularly to such a machine having means for visually indicating the condition of operation.

Metal routing or removal by electronic means has now been used for several years. Machines for performing such operations are variably complex or relatively simple. The less complex machines using the method disclosed in my copending application, Ser. No. 130,734, filed Apr. 2, 1971, abandoned, are used for a variety of purposes including the disintegration of taps, and screw threaded means which are broken off in threaded holes, the removal of small amounts of metal - particularly on interior surfaces - and the forming of extremely hard metals such as tungsten carbide. In all cases, the operation is performed in an electrolytic material which must completely cover the work operation. Thus visual observation of the operation of the electrode is usually almost impossible.

Since the spark emission at the electrode does produce sound, it is usually possible to hear whether the device is operating correctly or not. But this control depends on the noise level in the place where the machine is operating. A visual reference for proper electrode arcing action would seem to be very desirable.

By my invention, I provide a means of visual observation to indicate whether the electrode is properly providing the necessary arcing action, whether the electrode is not making proper contact at all, or whether the contact is too great for proper arc action.

Electric deposition of metal is also fairly common and not so difficult of control because not often done in an electrolyte. However, my invention may also be useful with such a device.

My invention may also be useful in another way since the energy used to actuate the visual control may be used through proper amplification or the like to actually physically operate the controls for the machine to select the proper operating position.

FIGURES

FIG. 5 is a wiring diagram showing the electrical connections for the operation of my visual indicator, and FIG. 6 shows an alternate type of applicator.

DESCRIPTION

Briefly my device consists of an electronic metal router or the like having a visual indicator preferably a light to indicate by its condition whether the proper arcing is taking place at the point of any electrode and particularly a submerged electrode.

Figure 1:
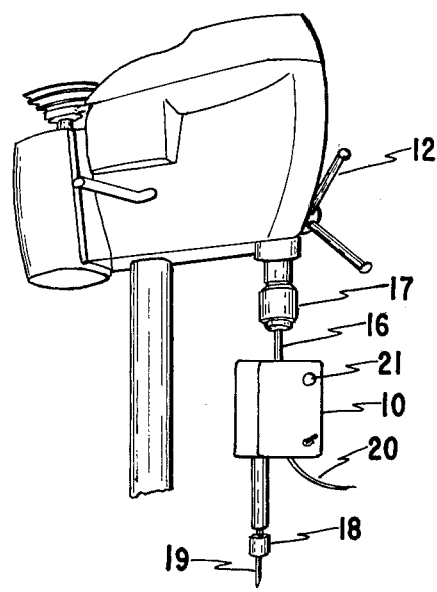
FIG. 1 is a pictorial view of a machine of the general type to which my invention may be applied as attached to a drill press.
Figure 2:
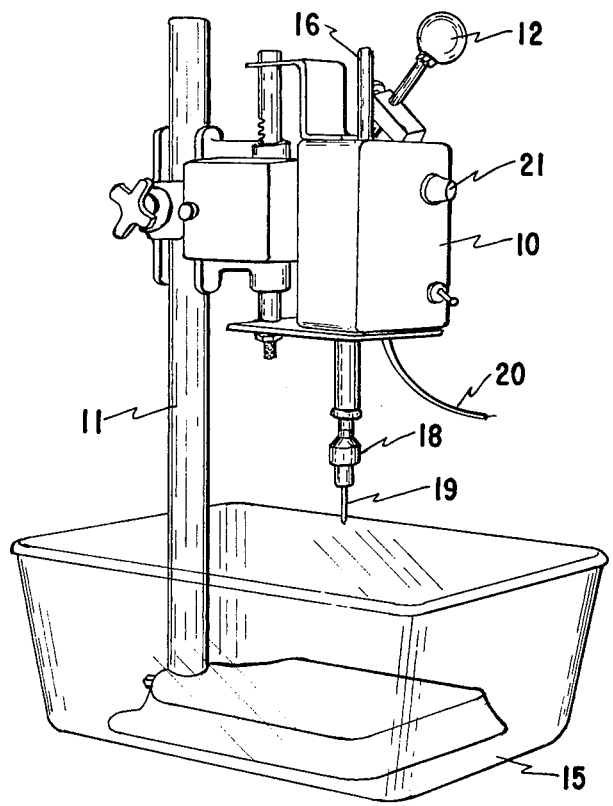
FIG. 2 is a pictorial view of the machine used for disintegration of metal.
Figure 3:
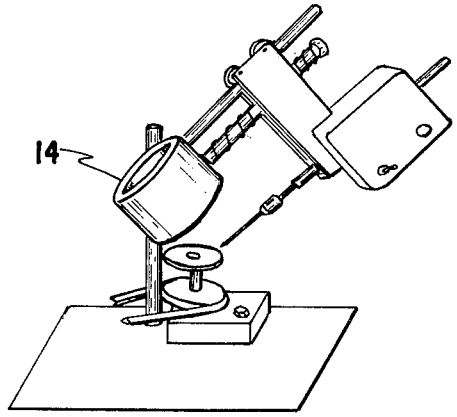
FIG. 3 is a pictorial view of my machine as it may be used for the deposition of metal on a circular piece.
Figure 4:
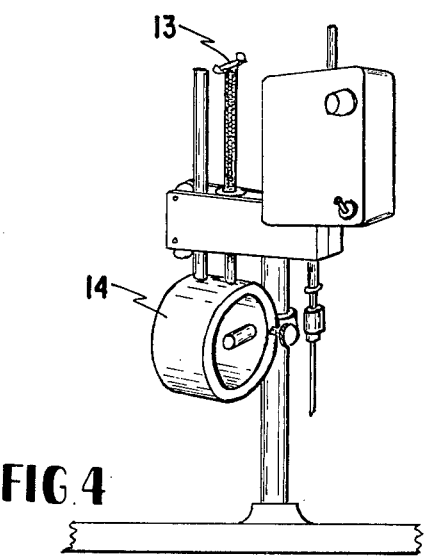
FIG. 4 is a similar view of the device of FIG. 3 in an upright position for vertical use.

More specifically, my device includes a vibrator unit enclosed in a case 10. The case is mounted on a stand 11 through any chosen type of mounting means. In the illustrations, I have shown various means by which the case 10 may be raised or lowered or otherwise moved relative to the stand 11. In FIGS. 1 and 2, the means may be a lever 12. In FIG. 3 a positioning spring is used, and in FIG. 4 a screw 13 is utilized. The lever 12 may operate a gear and pinion arrangement or simply slide the case up and down a pair of ways or on a keyway in a manner well known in the art. The screw is shown operating against a positioning ring 14, but other devices will also occur to those skilled in the art.

The stand 11 is either mounted in or extends the case 10 over an electrolyte tank 15 adapted to hold the electrolytic material necessary to the operation of disintegrating metal (FIG. 2). Although the tank 15 may be shown as transparent, it often is opaque as is the electrolyte within the tank.

My device can also be used as an attachment to a drill press (FIG. 1) and thus use the raising and lowering mechanism of the drill press to provide movement of my device toward and away from the piece being worked on. In order to provide for this mode of operation, I use a post 16 of appropriate size fixed either to the case 10 or the vibrator within the case to carry to the mechanism. The post can then be fixed within the chuck 17 of the drill press to provide for its operation.

The vibrator within the case causes the eletrode holder 18, and consequently the electrode 19 to vibrate rapidly in a vertical manner as is well known in the art. This provides - when operation is proper - for a rapid series of arcs between electrode and workpiece which, with the instand quench provided by the electrolyte causes the metal at the arc to be eroded and carried away.

The arcs are produced by the discharge from a proper capacitance in a power supply unit not shown, but electrically connected to the electrode 19 through a cable or wire 20 leading into the case 10. The rapid series of discharges through the arcing action causes an intermittent electrical current flow of comparatively high frequency. By utilizing the feature of intermittence, an indicator can be devised to show whether there is a proper arcing or not.

I chose to use the simple indication provided by a light source. The ordinary incandescent lamp, being more fragile and mounted on the same mounting as a vibrating unit is not desirable. However, a tube or bulb using a gaseous discharge is ideal for this type of situation. Therefore, I prefer to use a neon bulb 21 since it is readily available. However, a light producing device which will operate to flash rapidly enough to follow the discharges at the electrode will be satisfactory.

In the wiring diagram, FIG. 5, I indicate how the flasher bulb 21 is wired into the discharge circuit. As shown, the power supply uses a variable voltage control and in output is similar to that shown in my previous applications, Ser. No. 76,084, filed Sept. 28, 1970, now abandoned, Ser. No. 130,734, filed Apr. 2, 1971, abandoned, Ser. No. 271,388, filed July 13, 1972 and U.S. Pat. No. 3,524,956. It will be apparent that this power supply circuit is useful either for routing metal or for deposition of metal or for surface treatment. By providing for variable resistance 22 at the direct current output of the bridge rectifier 23 as it feeds the capacitance 24, I can provide for sizable variations in voltage. Incremental variations in voltage may also be provided by varying conditions of output from the transformer 27. The electrode 19 is controlled by a vibrator 25 and is supplied with voltage from the capacitance 24. The indicator 21 is connected across the supply to the electrode and the electrical contact with the workpiece so that it will be lighted when there is no discharge from the electrode and be dark when the electrode is shorted out or in contact with ground.

It will be apparent from the diagram that the bulb 21 will be completely lighted by the current flow through its network when there is no shunting of current through the electrode 19 to the workpiece. Thus, when there is no contact between electrode 19 and workpiece, the bulb will glow brightly. Conversely, when the electrode is in constant contact with the workpiece, nearly all of the current will flow through that route, effectively shunting past the tube 21 which will then be dark.

The ideal and correct situation will occur when the vibrating of the electrode 19 of the vibrator causes it to draw a rapid series of arcs from the workpiece. This causes a rapid intermittent fluctuation of current through the circuits and results in a rapid blinking of the bulb 21. Thus it is possible to determine whether or not the proper operation at the tip of the electrode is taking place. Thus an operator, merely by watching the indicator, can tell if operation is proper, and if operation is not proper, the operator will also know which direction to move the electrode to establish proper operation.

It will also be apparent that the blinking light or fluctuating voltage may be used to actuate, through proper pickup, amplification and circuit design if necessary, a motor drive adapted to move the electrode in the proper direction until optimum operation is achieved.

It will also be evident that such units as shown in FIG. 6 or alternate power circuits may be substituted for that shown in FIG. 5.

I claim:

1. An electrical discharge machining device for spark treatment of a workpiece comprising: an electrode, a workpiece, means to move the electrode toward and away from the workpiece, capacitive discharge power supply means connected between the electrode and workpiece, monitoring means including a light means to indicate proper operation of the device whereby; a no contact condition between the electrode and workpiece is indicated by a bright light from said light means; proper sparking condition between the electrode and workpiece is indicated by a blinking light from said light means; and a shorted condition between the electrode and workpiece is indicated by no illumination of said light means.

2. The device of claim 1 whereby the spark treatment takes place in a liquid dielectric bath.

3. The device of claim 1 whereby the spark treatment takes place in a gaseous dielectric.

4. The device of claim 1 in which said light means is a gaseous discharge lamp.

5. The device of claim 1 in which said light means is an incandescent lamp.

6. The device of claim 1 in which the electrode is vibrated.

7. The device of claim 1 in which said light means is electrical connected in parallel with said electrode.

* * * * *